(12) United States Patent
Guide, Jr. et al.

(10) Patent No.: US 7,816,634 B1
(45) Date of Patent: Oct. 19, 2010

(54) BARBEQUE ASSEMBLY

(75) Inventors: William Guide, Jr., Chicago, IL (US); Steven Bolek, Homer Glen, IL (US)

(73) Assignee: Pit Crew Barbeque, LLC, Summit, IL (US)

( * ) Notice: Subject to any disclaimer, the term of this patent is extended or adjusted under 35 U.S.C. 154(b) by 1070 days.

(21) Appl. No.: 11/386,331

(22) Filed: Mar. 22, 2006

Related U.S. Application Data

(60) Provisional application No. 60/664,066, filed on Mar. 22, 2005.

(51) Int. Cl.
*H05B 6/78* (2006.01)
*A47J 43/28* (2006.01)

(52) U.S. Cl. .............. 219/726; 30/150; 294/8

(58) Field of Classification Search ........... 219/726, 219/732, 735, 754, 763; D7/683; 362/119, 362/120; 294/3, 7, 8, 16, 28; 401/270, 183, 401/186, 269; 220/735, 756, 912; 30/150, 30/327

See application file for complete search history.

(56) References Cited

U.S. PATENT DOCUMENTS

| | | | |
|---|---|---|---|
| 846,010 A * | 3/1907 | Corbell | 220/627 |
| 1,534,202 A * | 4/1925 | Boley et al. | 30/150 |
| D193,440 S | 8/1962 | Vernon | |
| 3,596,965 A * | 8/1971 | Woofter | 294/8 |
| D258,940 S | 4/1981 | Zelinski | |
| D272,406 S | 1/1984 | Steiner | |
| 5,023,761 A * | 6/1991 | de Lange | 362/120 |
| 5,105,963 A * | 4/1992 | Scott | 220/735 |
| 6,557,264 B1 * | 5/2003 | Maeda | 30/327 |
| D481,916 S | 11/2003 | Kortleven et al. | |
| D525,836 S | 8/2006 | Moore | |
| D552,928 S * | 10/2007 | Jonas, Jr. | D7/401.2 |
| 2005/0138736 A1 * | 6/2005 | Tarlow | 7/110 |

* cited by examiner

*Primary Examiner*—Quang T Van
(74) *Attorney, Agent, or Firm*—Banner & Witcoff, Ltd.

(57) ABSTRACT

A cooking utensil has a first member connected to a second member in a generally transverse configuration. The first member has a first end and a second end. The first end of the first member has a turner element used for turning food products. The second member has a first end and a second end. The first end of the second member has a fork element thereon. The second end of the second member has a brush assembly thereon used for applying sauces and condiments to food products. A cooperative structure is associated with the first member and the second member to connect the members in the generally transverse configuration.

12 Claims, 7 Drawing Sheets

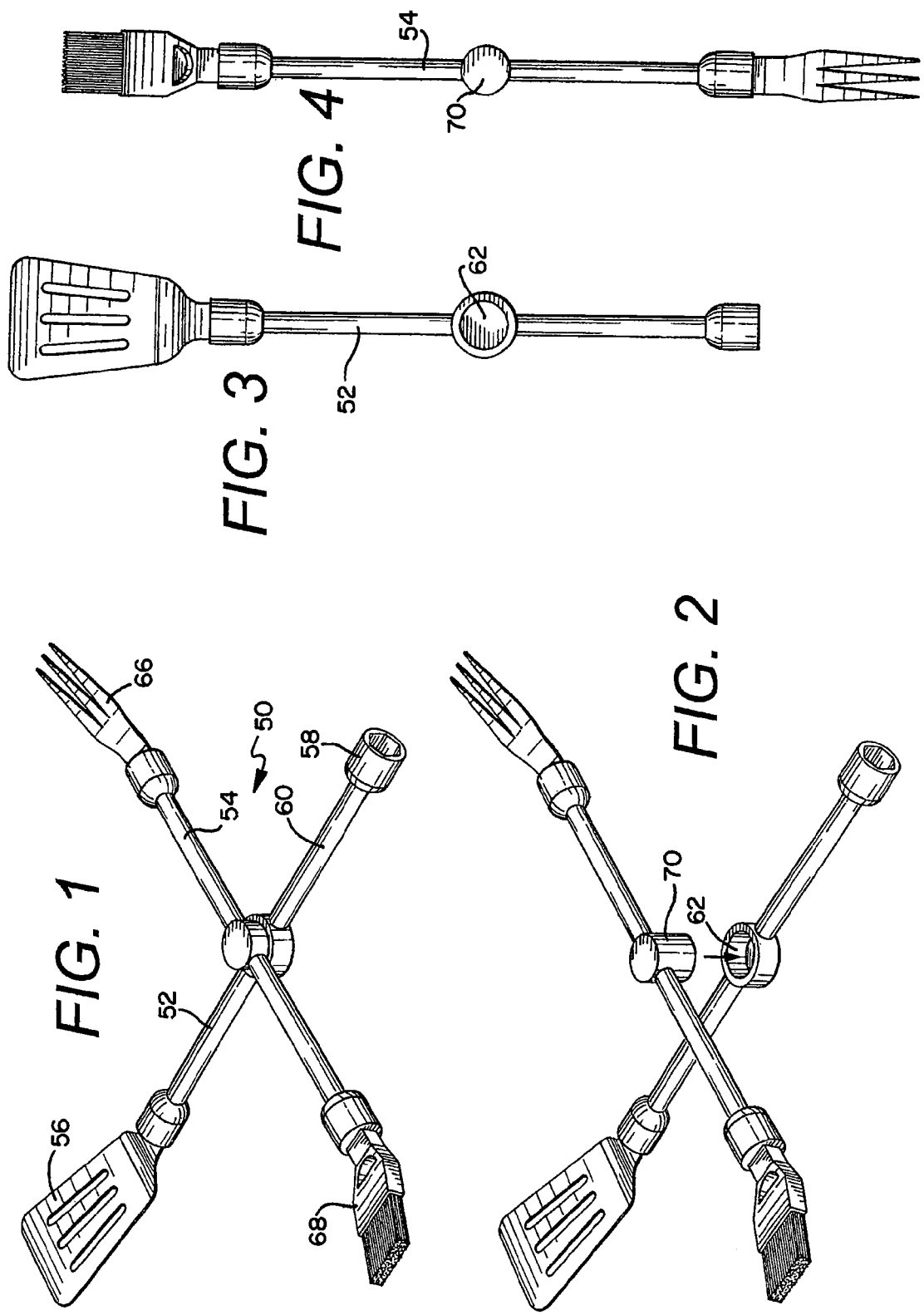

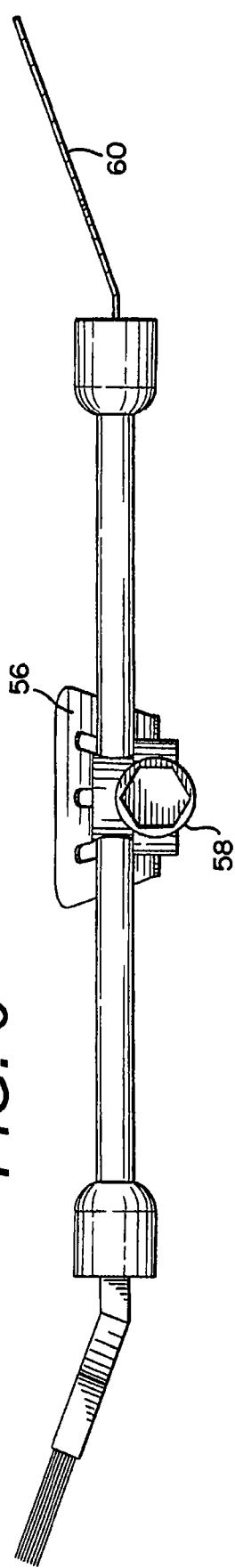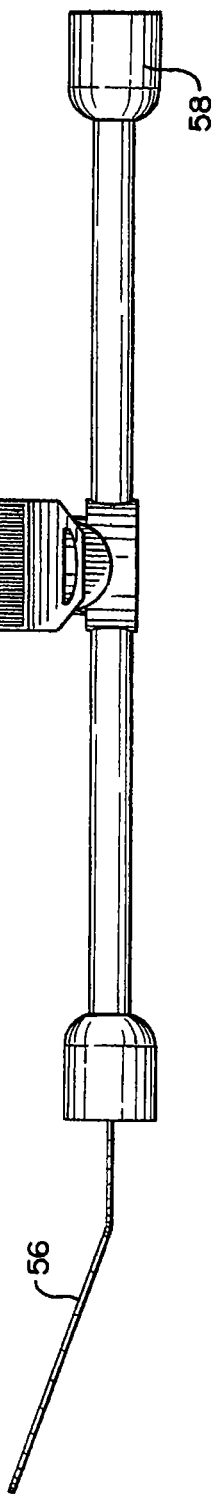

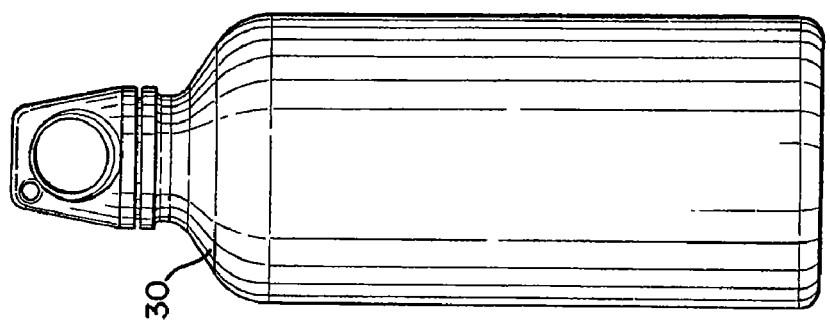
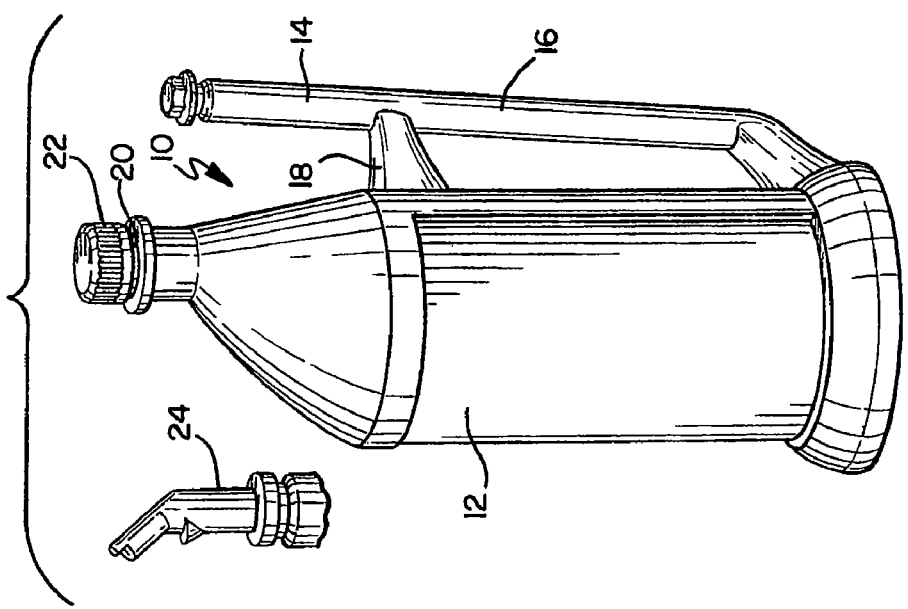
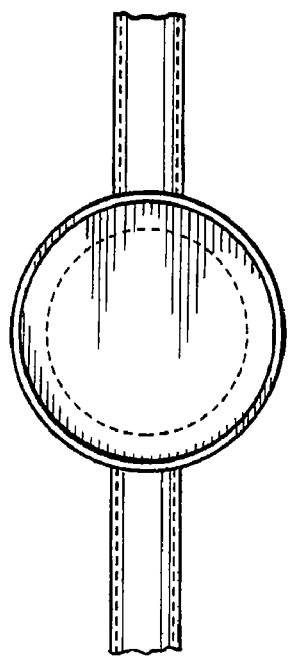
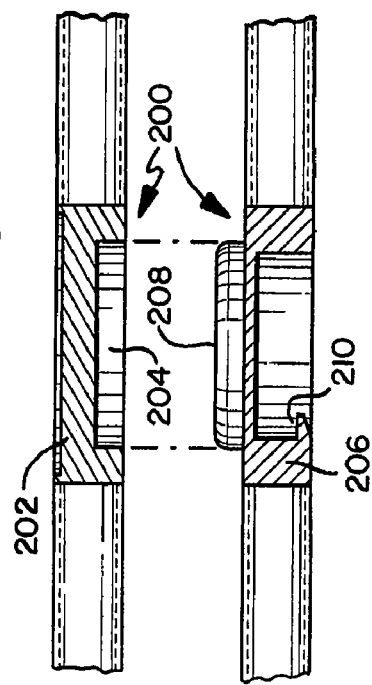

BARBEQUE ASSEMBLY

CROSS-REFERENCE TO RELATED APPLICATIONS

The present application claims priority to and the benefit of U.S. Provisional Application No. 60/664,066, filed on Mar. 22, 2005, which application is incorporated by reference and made a part hereof.

TECHNICAL FIELD

The invention relates to a barbeque assembly that can be used in grilling food products.

BACKGROUND OF THE INVENTION

Barbeque products and accessories are well known and used in grilling food products. While such products of the prior art provide a number of advantageous features, they nevertheless have certain limitations. The present invention seeks to overcome certain of these limitations and drawbacks of the prior art, and to provide new features not heretofore available.

A full discussion of the features and advantages of the present invention is deferred to the following detailed description, which proceeds with reference to the accompanying drawings.

SUMMARY OF THE INVENTION

The present invention provides a barbeque assembly in the form of a cooking utensil for grilling food products. In a preferred embodiment, the utensil is in the form of a four-way tire iron.

The present invention also provides a bottle design to be used with sauces and condiments including barbeque sauces, hot sauces and marinades. The bottle design may replicate a fuel can used at racing events.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a barbeque assembly in the form of a cooking utensil according to the present invention;

FIG. 2 is an exploded perspective view of the cooking utensil of FIG. 1;

FIG. 3 is a plan view of a first member of the cooking utensil of FIG. 1;

FIG. 4 is a plan view of a second member of the cooking utensil of FIG. 1;

FIG. 6 is a side elevation view of the cooking utensil of FIG. 1;

FIG. 7 is another side elevation view of the cooking utensil of FIG. 3;

FIG. 14 is a partial plan view of a member of another embodiment of the cooking utensil of the present invention;

FIG. 15 is a partial exploded cross-sectional view showing connection structure of members of an alternative embodiment of the cooking utensil of the present invention;

FIG. 16 is a perspective view of a bottle according to the present invention and also showing a nozzle attachment for the bottle; and, FIG. 17 is a perspective view of an alternative embodiment of a bottle of the present invention.

DETAILED DESCRIPTION

Figure 5:
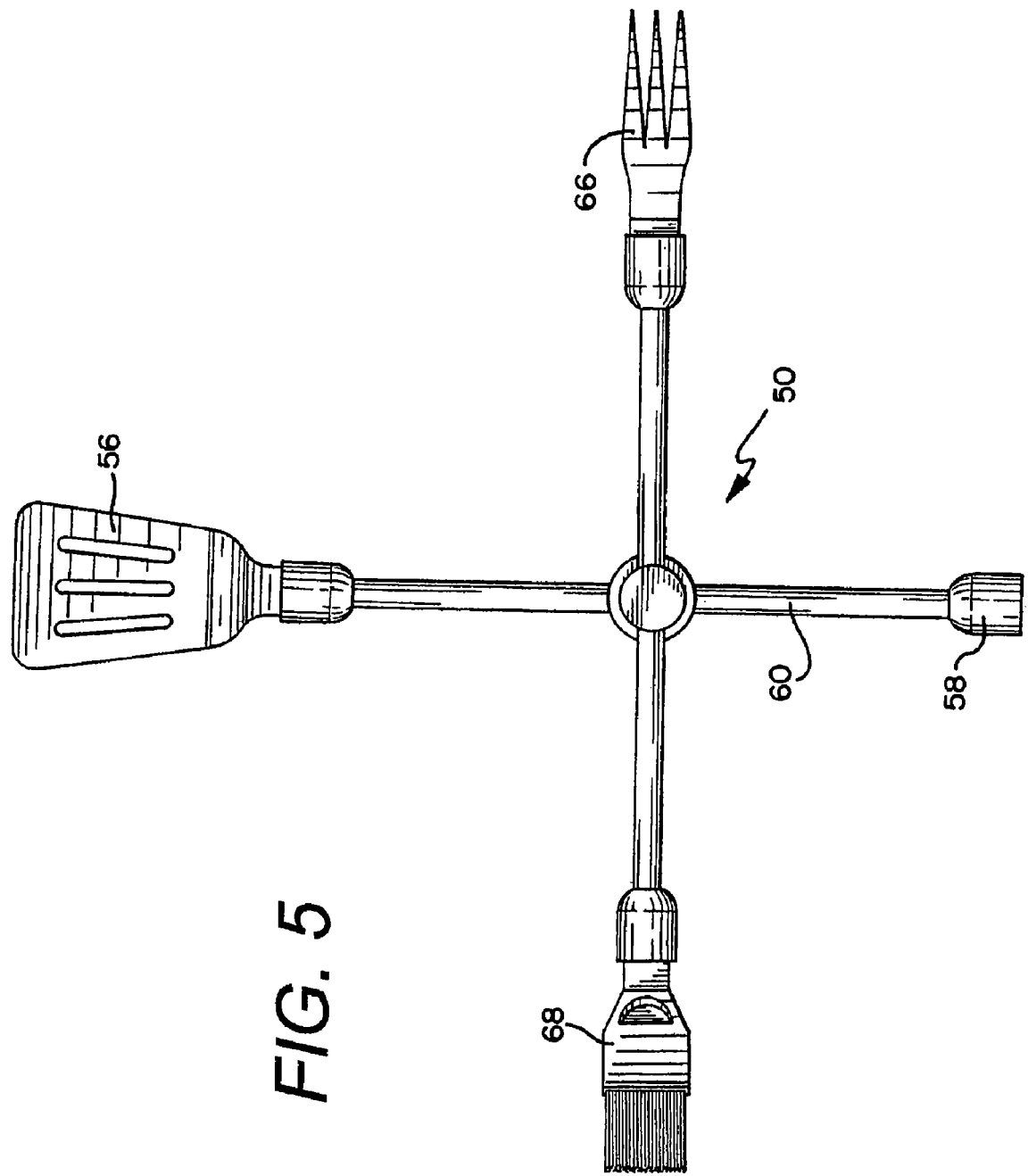
FIG. 5 is a plan view of the cooking utensil of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-7 show an embodiment of the barbeque grilling assembly or cooking utensil 50 of the present invention. The cooking utensil 50 is generally in the form of a tire iron used with cars and that may be used at racing events. The cooking utensil 50 is designed for grilling food products such as at outdoor events and parties. The generally crossed-shaped or transverse configuration of the utensil 50 provides an ease of use when grilling food products as well as an aesthetically pleasing appearance to users. To achieve the crossed-shaped configuration, a cooperative structure is operably associated with members of the utensil 50 as discussed in greater detail below.

The cooking utensil 50 generally has a first member 52 and a second member 54 that are interconnected as described in greater detail below. The first member 52 generally has a first end and a second end and can be made from any generally rigid or semi-rigid material. The first end has a spatula attachment 56, or turner element, used for turning food products. Preferably, the spatula 56 is made from stainless steel. It is understood that the first member may have areas for placing indicia or advertising logos thereon. The second end of the first member is in the form of a wrench head element 58 that would be designed to fit a lug nut used on a car wheel assembly. The portion 60 of the first member proximate the second end may function as the handle of the utensil 50. The first member has an opening 62 at generally a midpoint of the member 52 to accept a portion of the second member 54 to be described in greater detail below.

The second member 54 generally has a first end and a second end and can also be made from any generally rigid or semi-rigid material. The first end has a fork assembly element 66 that is preferably stainless steel. The second end has a brush assembly element 68 used for applying sauces and condiments to food products. The second member 54 has a protrusion 70 at generally a midpoint of the member to cooperate with the opening 62 in the first member 52. The second member 54 may also have indicia thereon.

The first member 52 and the second member 54 are interconnected together proximate their respective midpoints. In one preferred embodiment, the protrusion 70 on the second member 54 fits into the opening 62 on the first member 52. A set screw may be provided to secure the connection. Thus, the opening 62 and the protrusion 70 provide a cooperative structure operably associated with the members 52,54 for connecting the members 52,54 to one another. Other connection structures may also be used that are known in the art. The connection of the members 52,54 generally forms a cross-shaped assembly that resembles a tire iron used to change car tires. In one preferred embodiment, the first member 52 is generally transverse to the second member 54, and most preferably in a 90 degree configuration. It is understood, however, the crossed-shaped configuration can be at other angles. It is further understood that the members are made from heat resistant materials.

Figure 10:
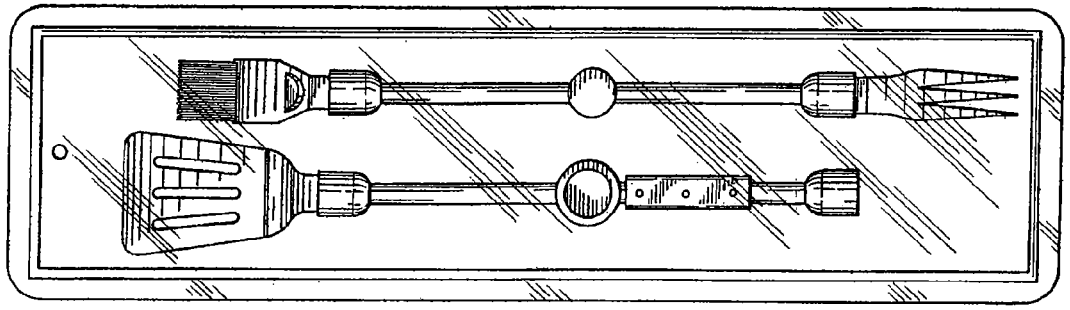
FIG. 10 is a plan view of a first member and a second member of the cooking utensil of FIG. 8.
Figure 8:
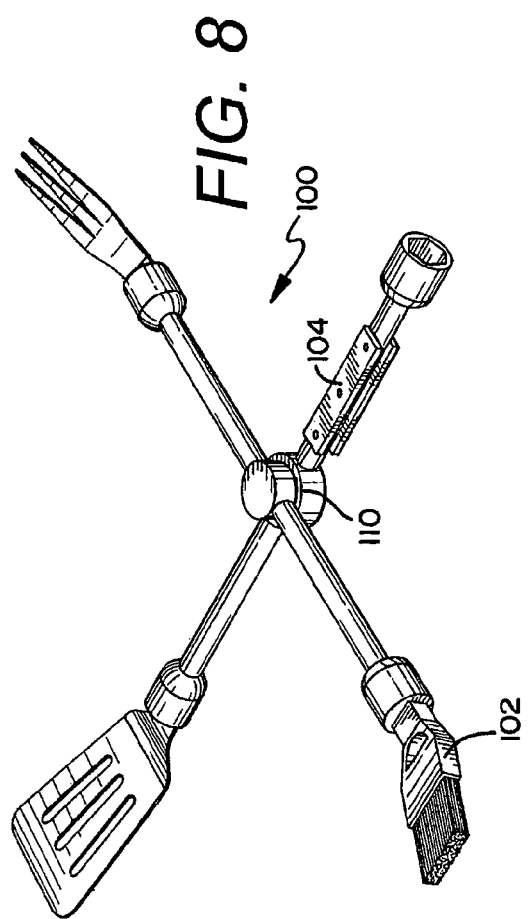
FIG. 8 is a perspective view of another embodiment of a barbeque assembly in the form of a cooking utensil according to the present invention.
Figure 9:
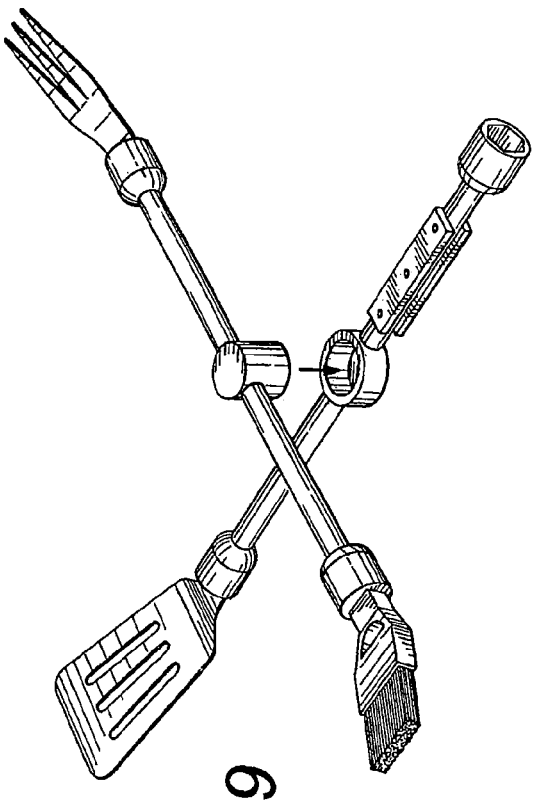
FIG. 9 is an exploded perspective view of the cooking utensil of FIG. 8.
Figure 11:
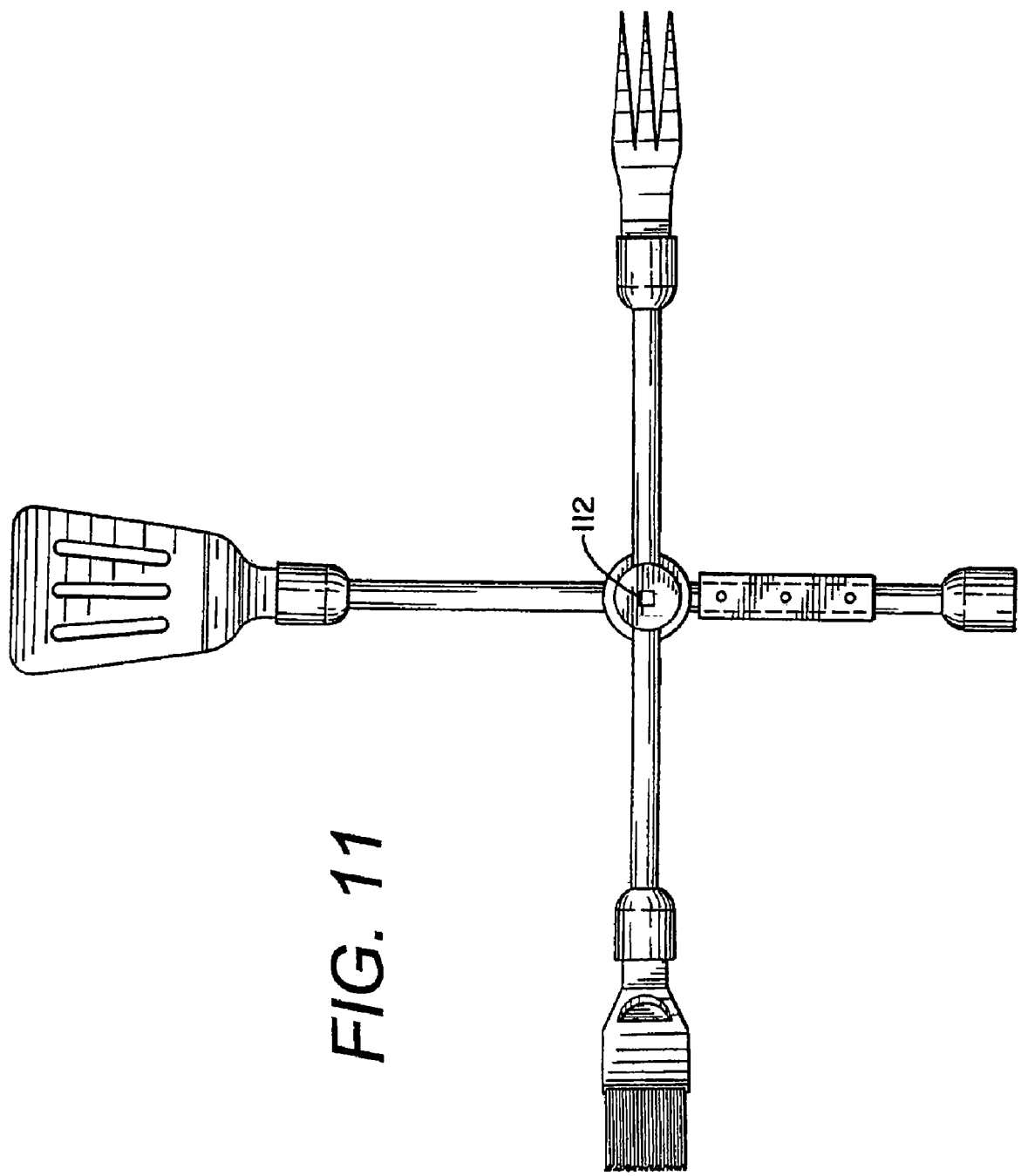
FIG. 11 is a plan view of the cooking utensil of FIG. 8.
Figure 12:
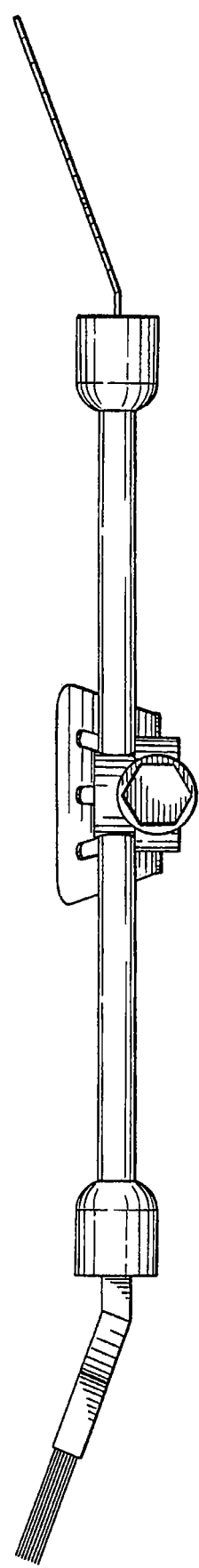
FIG. 12 is a side elevation view of the cooking utensil of FIG. 8.
Figure 13:
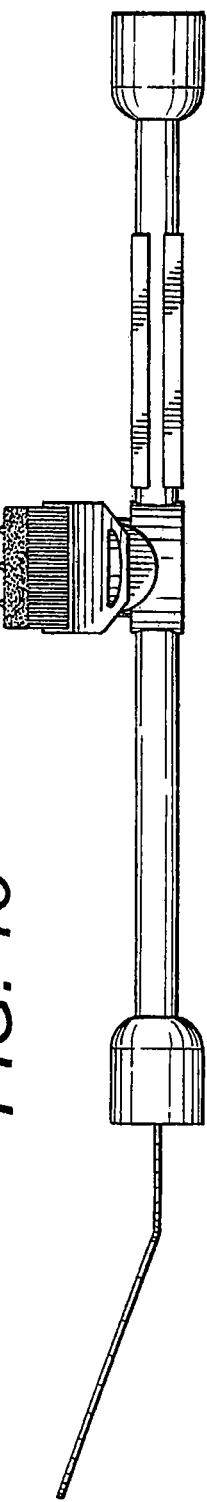
FIG. 13 is another side elevation view of the cooking utensil of FIG. 8.

FIGS. 8-13 disclose another embodiment of the cooking utensil 100 of the present invention. The cooking utensil 100 is similar in construction to the cooking utensil of FIGS. 1-7. In this embodiment, a brush assembly 102 at the second end of the second member may be removably attached. In this fashion, the brush attachment 102 can be removed and replaced with a new brush attachment when needed. It is contemplated that the other elements such as the turner element and the fork element could also be removably attached. A wooden handle attachment 104 may also be connected around the second end of the first member. In addition, a cooperative structure in the form of a snap fit assembly 110 may be used between the first member and the second member to interconnect the members. The snap fit assembly may also utilize a push button 112 feature wherein the members can be taken apart and connected back together at a later time. This may be useful when cleaning and storing the utensil.

FIGS. 14 and 15 disclose another embodiment of the cooking utensil of the present invention. As discussed, a cooperative structure is associated with the first member and the second member wherein the members can be connected in the generally transverse configuration. In one preferred embodiment, the cooperative structure is a magnetic structure 200. FIG. 14 is a plan view of one of the members. As shown in FIG. 15, the first member has a first connector portion 202 having a recess 204. The second member has a second connector portion 206 having a projection 208. The recess 204 receives the projection 208 and the connector portions are magnetized wherein the magnetic attraction suitably connects the first member to the second member. The magnetic strength is sufficient to connect the members wherein the members cannot be rotated relative to one another, but can be pulled apart upon sufficient force from a user once the user is done using the cooking utensil such as for washing and storing. It is understood that the cooperative structure in the form of a magnet is but one preferred embodiment of the invention. Other cooperative structures associated with the members can also be used. It is further contemplated that a bottle opener assembly 210 can be included on the member generally opposite the projection 208.

FIG. 16 shows a bottle of the present invention, generally designated with the reference numeral 10. The bottle 10 is used for holding sauces and condiments such as barbeque sauce. The bottle 10 can also be used with a variety of other flowable substances. The bottle 10 has a main container portion 12 and a secondary container portion 14. The secondary container portion 14 may also function as a handle 16. A supporting member 18 extends between the container portions 12,14. The main container portion 12 has an outlet 20 having a cap 22. A separate nozzle assembly 24 may also be used with the bottle 10. The bottle 10 is similarly shaped, although obviously smaller, to a gas can used at racing events. The bottle may have an area for placing an advertisement logo thereon. The bottle may also have a transparent window to show the contents of the bottle. FIG. 17 shows an alternative embodiment of the bottle 30 of the present invention that is used to hold sauces and condiments.

The present invention provides a novel bottle design and novel cooking utensil. The designs provide aesthetic features desirable to consumers that may frequent racing events.

While the specific embodiments have been illustrated and described, numerous modifications come to mind without significantly departing from the spirit of the invention, and the scope of protection is only limited by the scope of the accompanying Claims.

What is claimed is:

1. A barbeque grilling utensil comprising:
    a first member having a first end and a second end, the first end having a turner element thereon for turning food products;
    a second member having a first end and a second end, the first end of the second member having a fork element thereon; and
    a cooperative structure operably associated with the members wherein the structure connects the first member to the second member in a generally crossed-shape, wherein an angle between the first member and the second member is generally 90 degrees, and wherein the cooperative structure is a magnet structure positioned between the members, and wherein the magnet structure has a first connector portion on the first member, the first connector portion having a projection, the magnet structure further having a second connector portion on the second member, the second connector portion having a recess, the projection being received in the recess wherein a magnet attraction between the connector portions removably connects the first member and the second member.

2. The utensil of claim 1 wherein the second end of the first member has a wrench head element thereon.

3. The utensil of claim 1 wherein the second end of the second member has a brush assembly thereon.

4. The utensil of claim 1 wherein the first member and the second member each extend along a linear axis and wherein the turner element and fork element are generally 90 degrees apart.

5. The utensil of claim 1 wherein a wood handle is positioned around the first member.

6. The utensil of claim 1 wherein the turner element and the fork element are stainless steel.

7. The utensil of claim 1 wherein the cooperative structure is positioned proximate respective midpoints of the first member and the second member.

8. The utensil of claim 1 wherein the first connector portion is positioned at generally a midpoint of the first member and the second connector portion is positioned at generally a midpoint of the second member.

9. The utensil of claim 8 further comprising a bottle opener positioned on the first connector portion generally opposite the projection.

10. A barbeque grilling utensil comprising:
    a first member having a first end and a second end, the first member extending along a linear axis, the first end having a turner element thereon for turning food products, the second end having a wrench head element thereon;
    a second member having a first end and a second end, the second member extending along a linear axis, the first end of the second member having a fork element thereon; and a magnet structure operably associated with the members wherein the structure connects the first member to the second member in a generally crossed-shape wherein an angle between the first member and the second member is generally 90 degrees, and wherein the first member and second member generally reside in a horizontal plane, the magnet structure having a first connector portion on the first member, the first connector portion having a projection, the magnet structure further having a second connector portion on the second member, the second connector portion having a recess, the projection being received in the recess wherein a magnet attraction between the connector portions removably connects the first member and the second member.

11. The utensil of claim 10 wherein the first connector portion is positioned at generally a midpoint of the first member and the second connector portion is positioned at generally a midpoint of the second member.

12. The barbeque grilling utensil of claim 10 further comprising a bottle opener positioned on the first connector portion generally opposite the projection.

* * * * *